UNITED STATES PATENT OFFICE.

HENRY B. SLAUGHTER, OF CRUMPTON, MARYLAND.

IMPROVEMENT IN PRESERVING FRUITS, &c., IN SEALED CANS.

Specification forming part of Letters Patent No. 36,921, dated November 11, 1862.

*To all whom it may concern:*

Be it known that I, HENRY B. SLAUGHTER, of Crumpton, in the county of Queen Anne and State of Maryland, have invented a new and useful process in preserving fruits, meats, vegetables, &c., in cans or jars, and hermetically sealing the same; and I do hereby declare that the following is a full, clear, and exact description of the same.

For preserving fruits I proceed as follows: An ordinary tin can having been filled with fruit, and the opening in the head of the can through which the fruit is inserted having been closed, except the small opening or openings left for the escape of the air generally, but which I leave for another purpose, the can is then immersed in a sirup and boiled therein from three to fifteen minutes, depending somewhat upon the size of the can and the kind of fruit, after which boiling it is taken out and the small hole or holes soldered up.

I find that by providing two small holes or openings in the head or cap of the can the sirup will circulate through the fruit in the can, apparently passing in at one hole and out at the other, or possibly driving out the air at the other and following the expelled air, and I prefer to so use the two holes; but one hole will answer, and that hole may be the one through which the fruit is inserted in the can. This hole, though it answers the purpose, is not so good as the small "air-hole" as it is sometimes called, nor is one air-hole so good as two; but I do not desire to restrict myself to the number or size of the holes through which the sirup may enter or the air escape. My invention, as I regard it, consists in boiling the can containing the fruit immersed in a sirup, and so that the sirup may freely circulate through the fruit in the can. In preserving meats or vegetables other liquids may be used; but in all cases the boiling is done with the cans immersed in the liquid, and a free circulation allowed between the liquid and the contents of the can or jar, and the circulating opening or openings are closed, as soon as the can or jar is taken out of the boiling liquid, by solder, or otherwise.

I am aware that fruit-cans have been boiled in water, both closed and open; but in the latter case they are reheated after being closed. In my case I boil but once in sirup with the can open, and seal it up but once.

Having thus fully described my invention, what I claim in the process of preserving fruits, meats, &c., in hermetically-sealed cans or jars, is—

Leaving an opening or openings in the can or jar and immersing it in sirup or other liquid, and boiling it thus immersed or submerged, so that the sirup or liquid may circulate through the fruit or other contents of the can or jar, substantially as herein described.

HENRY B. SLAUGHTER.

Witnesses:
RICHARD L. HOWELL,
J. L. SPAZ.